(12) United States Patent
Ho (10) Patent No.: US 10,059,165 B2
(45) Date of Patent: *Aug. 28, 2018

(54) BATTERY SYSTEM WITH HEAT EXCHANGE DEVICE

(71) Applicant: THUNDER POWER NEW ENERGY VEHICLE DEVELOPMENT COMPANY LIMITED, Central (HK)

(72) Inventor: Ming-Hui Ho, Tainan (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

This patent is subject to a terminal disclaimer.

(21) Appl. No.: 15/348,490

(22) Filed: Nov. 10, 2016

(65) Prior Publication Data

US 2017/0057374 A1 Mar. 2, 2017
US 2017/0297409 A9 Oct. 19, 2017

Related U.S. Application Data

(60) Division of application No. 14/967,372, filed on Dec. 14, 2015, which is a continuation of application No.
(Continued)

(51) Int. Cl.
*H01M 10/48* (2006.01)
*B60H 1/00* (2006.01)
(Continued)

(52) U.S. Cl.
CPC ....... *B60H 1/00392* (2013.01); *B29C 65/002* (2013.01); *B32B 3/266* (2013.01);
(Continued)

(58) Field of Classification Search
CPC .... C09J 5/00; H01M 10/6563; H01M 10/663; H01M 10/6557; H01M 10/63;
(Continued)

(56) References Cited

U.S. PATENT DOCUMENTS 4,007,315 A 2/1977 Brinkmann et al.
4,079,275 A 3/1978 Fu
(Continued)

FOREIGN PATENT DOCUMENTS

CN 101291834 A 10/2008
CN 102057532 A 5/2011
(Continued)

OTHER PUBLICATIONS

U.S. Appl. No. 14/821,789, filed Aug. 10, 2015 Non-Final Rejection dated Oct. 17, 2016, all pages.
(Continued)

*Primary Examiner* — Lisa S Park
(74) *Attorney, Agent, or Firm* — Kilpatrick Townsend & Stockton LLP (57) ABSTRACT

A battery pack is provided including: a plurality of battery cells arranged in multiple battery cell rows; one or more heat exchange spaces; and a device for providing heat exchange to the battery pack. Further, the device includes a heat conduction medium passage arranged in the heat exchange spaces, such that the heat conduction medium passage surrounds multiple battery cells each battery cell row. The heat conduction medium passage is provided with at least a first group of channels and a second group of channels, which are in contact with the surface of each battery cell, and a heat conduction medium is provided in the first group of channels and the second of channels. The heat conduction medium flows in the first group of channels in a direction opposite from the flow of the heat conduction medium in the second group of channels.

8 Claims, 6 Drawing Sheets

Related U.S. Application Data

14/821,789, filed on Aug. 10, 2015, now Pat. No. 9,538,278.

(60) Provisional application No. 62/150,848, filed on Apr. 22, 2015, provisional application No. 62/133,991, filed on Mar. 16, 2015.

(51) Int. Cl.

| | |
|---|---|
| *B60L 11/18* | (2006.01) |
| *G06K 9/00* | (2006.01) |
| *G06F 3/0488* | (2013.01) |
| *G06F 3/0486* | (2013.01) |
| *G06F 3/0484* | (2013.01) |
| *G06F 3/0482* | (2013.01) |
| *B32B 7/04* | (2006.01) |
| *H01M 10/6566* | (2014.01) |
| *F16B 11/00* | (2006.01) |
| *F16B 5/04* | (2006.01) |
| *F16B 3/00* | (2006.01) |
| *C09J 5/00* | (2006.01) |
| *B60K 11/08* | (2006.01) |
| *B60K 11/04* | (2006.01) |
| *B60K 1/04* | (2006.01) |
| *B32B 15/01* | (2006.01) |
| *B32B 15/00* | (2006.01) |
| *B32B 3/26* | (2006.01) |
| *H02J 7/00* | (2006.01) |
| *G06F 3/041* | (2006.01) |
| *G06F 3/01* | (2006.01) |
| *G06F 3/00* | (2006.01) |
| *F25B 29/00* | (2006.01) |
| *B60R 1/00* | (2006.01) |
| *B60L 1/02* | (2006.01) |
| *B60H 1/22* | (2006.01) |
| *B60H 1/14* | (2006.01) |
| *B29C 65/00* | (2006.01) |
| *H01M 10/663* | (2014.01) |
| *H01M 10/658* | (2014.01) |
| *H01M 10/6568* | (2014.01) |
| *H01M 10/6563* | (2014.01) |
| *H01M 10/6557* | (2014.01) |
| *H01M 10/63* | (2014.01) |
| *H01M 10/625* | (2014.01) |
| *H01M 10/613* | (2014.01) |
| *B60K 1/00* | (2006.01) |

(52) U.S. Cl.
CPC ............ *B32B 7/04* (2013.01); *B32B 7/045* (2013.01); *B32B 15/00* (2013.01); *B32B 15/01* (2013.01); *B60H 1/00021* (2013.01); *B60H 1/00278* (2013.01); *B60H 1/00321* (2013.01); *B60H 1/00328* (2013.01); *B60H 1/00428* (2013.01); *B60H 1/00564* (2013.01); *B60H 1/00571* (2013.01); *B60H 1/00885* (2013.01); *B60H 1/143* (2013.01); *B60H 1/2215* (2013.01); *B60K 1/04* (2013.01); *B60K 11/04* (2013.01); *B60K 11/085* (2013.01); *B60L 1/02* (2013.01); *B60L 11/1809* (2013.01); *B60L 11/1848* (2013.01); *B60L 11/1861* (2013.01); *B60L 11/1862* (2013.01); *B60L 11/1864* (2013.01); *B60L 11/1874* (2013.01); *B60L 11/1875* (2013.01); *B60L 11/1879* (2013.01); *B60R 1/00* (2013.01); *C09J 5/00* (2013.01); *F16B 3/005* (2013.01); *F16B 5/04* (2013.01); *F16B 11/00* (2013.01); *F25B 29/00* (2013.01); *G06F 3/005* (2013.01); *G06F 3/017* (2013.01); *G06F 3/0416* (2013.01); *G06F 3/0482* (2013.01); *G06F 3/0486* (2013.01); *G06F 3/0488* (2013.01); *G06F 3/04842* (2013.01); *G06F 3/04847* (2013.01); *G06K 9/00013* (2013.01); *G06K 9/00342* (2013.01); *G06K 9/00832* (2013.01); *H01M 10/482* (2013.01); *H01M 10/486* (2013.01); *H01M 10/613* (2015.04); *H01M 10/625* (2015.04); *H01M 10/63* (2015.04); *H01M 10/658* (2015.04); *H01M 10/6557* (2015.04); *H01M 10/6563* (2015.04); *H01M 10/6566* (2015.04); *H01M 10/6568* (2015.04); *H01M 10/663* (2015.04); *H02J 7/0019* (2013.01); *H02J 7/0021* (2013.01); *B32B 2605/00* (2013.01); *B32B 2605/08* (2013.01); *B32B 2605/18* (2013.01); *B60H 2001/003* (2013.01); *B60H 2001/00092* (2013.01); *B60H 2001/00949* (2013.01); *B60K 2001/005* (2013.01); *B60K 2001/006* (2013.01); *B60R 2300/8006* (2013.01); *B60Y 2200/91* (2013.01); *B60Y 2306/07* (2013.01); *B60Y 2400/112* (2013.01); *F16B 11/006* (2013.01); *H01M 2220/20* (2013.01); *Y10T 428/24347* (2015.01)

(58) Field of Classification Search
CPC ............ H01M 10/617; H01M 10/658; H01M 10/625; H01M 10/643; H01M 2220/02; H01M 2220/20; H01M 10/482; H01M 10/486; H01M 10/613; G06F 3/017; G06F 3/005; G06F 3/0416; G06K 9/00832; G06K 9/00342; B60L 11/1864; B60L 11/1862; B60L 11/187; B60L 1/02; B60L 11/1874; B60L 11/1848; B60L 11/1809; B60L 11/1861; B60K 11/085; B60K 11/04; B60H 1/143; B60H 1/00278; B60H 9/00832; B60H 1/00321; B60H 1/00021; B60H 1/00564; B60H 1/00392; B60H 1/00328; B60H 1/00571; B60H 2001/00949; B60H 2001/003; B60H 2001/00092; F16B 11/00; F25B 29/00; B32B 3/266; B32B 7/04; B60R 1/00; B60R 2300/8006; H02J 7/0019; H02J 7/0021; B29C 65/002

See application file for complete search history.

(56) References Cited

U.S. PATENT DOCUMENTS

| | | |
|---|---|---|
| 5,121,044 A | 6/1992 | Goldman |
| 5,585,204 A * | 12/1996 | Oshida ................ H01M 10/443 429/120 |
| 5,875,691 A | 3/1999 | Hata et al. |
| 5,889,342 A | 3/1999 | Hasebe et al. |
| 6,089,034 A | 7/2000 | Lake et al. |
| 6,347,528 B1 | 2/2002 | Iritani et al. |
| 6,357,541 B1 | 3/2002 | Matsuda et al. |
| 6,450,275 B1 | 9/2002 | Gabriel et al. |
| 6,481,230 B2 | 11/2002 | Kimishima et al. |
| 6,575,258 B1 | 6/2003 | Clemmer |
| 6,772,504 B2 | 8/2004 | Weidman et al. |
| 6,933,076 B2 | 8/2005 | Ura et al. |
| 7,208,854 B1 | 4/2007 | Saban et al. |
| 7,230,404 B2 | 6/2007 | Kimito et al. |
| 7,451,808 B2 | 11/2008 | Busse et al. |
| 7,789,176 B2 | 9/2010 | Zhou |
| 7,834,500 B2 | 11/2010 | Savant |
| 7,841,431 B2 | 11/2010 | Zhou |
| 8,020,656 B2 | 9/2011 | Inoue et al. |

(56) References Cited

U.S. PATENT DOCUMENTS

| | | |
|---|---|---|
| 8,191,618 B2 | 6/2012 | Gering et al. |
| 8,336,319 B2 | 12/2012 | Johnston et al. |
| 8,450,888 B2 | 5/2013 | Shafer et al. |
| 8,479,855 B2 | 7/2013 | Kim et al. |
| 8,527,130 B2 | 9/2013 | Kitahata et al. |
| 8,896,167 B2 | 11/2014 | McKinzie et al. |
| 8,955,345 B2 | 2/2015 | Meitinger et al. |
| 9,180,753 B2 | 11/2015 | Kim et al. |
| 9,250,020 B2 | 2/2016 | Vikstrom et al. |
| 9,533,546 B2 | 1/2017 | Cheng |
| 9,533,547 B2 | 1/2017 | Cheng |
| 9,533,551 B2 | 1/2017 | Cheng |
| 9,539,877 B2 | 1/2017 | Cheng |
| 9,550,406 B2 | 1/2017 | Chen et al. |
| 9,604,546 B2 | 3/2017 | Chen et al. |
| 2002/0182493 A1* | 12/2002 | Ovshinsky ........ H01M 2/1077 429/176 |
| 2004/0080218 A1 | 4/2004 | Weidman et al. |
| 2005/0089750 A1* | 4/2005 | Ng ................ H01M 2/0242 429/120 |
| 2006/0132101 A1* | 6/2006 | Ambrosio .......... B60L 11/1855 320/150 |
| 2006/0211364 A1 | 9/2006 | Brotz et al. |
| 2007/0009787 A1* | 1/2007 | Straubel ............ H01M 2/105 429/99 |
| 2007/0084484 A1 | 4/2007 | Porter et al. |
| 2008/0024020 A1 | 1/2008 | Iund et al. |
| 2008/0311468 A1 | 12/2008 | Hermann et al. |
| 2009/0023056 A1 | 1/2009 | Adams et al. |
| 2009/0206689 A1 | 8/2009 | Harada et al. |
| 2011/0132580 A1* | 6/2011 | Herrmann ............ F28F 3/12 165/104.33 |
| 2011/0159340 A1* | 6/2011 | Hu ................ H01M 2/1077 429/120 |
| 2011/0229749 A1* | 9/2011 | Kim ................ H01M 10/486 429/120 |
| 2012/0129024 A1 | 5/2012 | Marchio et al. |
| 2012/0168125 A1 | 7/2012 | Johnston et al. |
| 2012/0222833 A1 | 9/2012 | Vikstrom et al. |
| 2012/0231316 A1 | 9/2012 | Sohn |
| 2012/0291987 A1 | 11/2012 | Himmer et al. |
| 2012/0297809 A1 | 11/2012 | Carpenter |
| 2013/0038151 A1 | 2/2013 | Ohashi et al. |
| 2013/0057117 A1 | 3/2013 | Suzuki et al. |
| 2013/0061630 A1 | 3/2013 | Schaefer et al. |
| 2013/0153338 A1 | 6/2013 | Yamauchi |
| 2014/0033865 A1 | 2/2014 | Suzuki et al. |
| 2014/0067323 A1 | 3/2014 | Skelton |
| 2014/0070013 A1 | 3/2014 | Stanek et al. |
| 2014/0077631 A1 | 3/2014 | Watanabe et al. |
| 2014/0124159 A1 | 5/2014 | Kim |
| 2014/0141300 A1* | 5/2014 | Ronning ............ H01M 2/1077 429/83 |
| 2014/0216709 A1 | 8/2014 | Smith et al. |
| 2014/0311704 A1 | 10/2014 | Yokoyama et al. |
| 2014/0333161 A1 | 11/2014 | Knoblauch |
| 2014/0356652 A1 | 12/2014 | Boddakayala et al. |
| 2015/0082821 A1* | 3/2015 | Ganz ................ F25B 1/005 62/259.1 |
| 2016/0272036 A1 | 9/2016 | Chen et al. |
| 2016/0272039 A1 | 9/2016 | Cheng |
| 2016/0272040 A1 | 9/2016 | Cheng |
| 2016/0272043 A1 | 9/2016 | Cheng |
| 2016/0272044 A1 | 9/2016 | Cheng |
| 2016/0272045 A1 | 9/2016 | Chen et al. |
| 2016/0276721 A1 | 9/2016 | Ho |
| 2016/0276722 A1 | 9/2016 | Ho |
| 2016/0276903 A1 | 9/2016 | Lai |
| 2016/0276905 A1 | 9/2016 | Lai |
| 2016/0336628 A1 | 11/2016 | Ho |
| 2017/0113509 A1 | 4/2017 | Chen et al. |
| 2017/0166032 A1 | 6/2017 | Chen et al. |

FOREIGN PATENT DOCUMENTS

| | | |
|---|---|---|
| CN | 202534754 U | 11/2012 |
| CN | 102089172 A | 9/2013 |
| CN | 103448685 A | 12/2013 |
| CN | 102442199 A | 2/2016 |
| CN | 103648808 A | 8/2016 |
| CN | 205632419 U | 10/2016 |
| CN | 205666301 U | 10/2016 |
| CN | 205768468 U | 12/2016 |
| CN | 206564305 U | 10/2017 |
| DE | 102011016613 A1 | 11/2011 |
| EP | 1937525 A2 | 7/2008 |
| EP | 1 990 849 A1 | 11/2008 |
| JP | 2014223867 A | 12/2014 |
| KR | 10-2012-0061236 A | 6/2012 |
| WO | 2006/124663 A2 | 11/2006 |
| WO | 2015/035406 A1 | 3/2010 |
| WO | 2011/029538 A1 | 3/2011 |

OTHER PUBLICATIONS

U.S. Appl. No. 14/967,372, filed Dec. 14, 2015 Non Final Rejection dated Jul. 15, 2016, all pages.
U.S. Appl. No. 14/967,372, filed Dec. 14, 2015 Final Rejection dated Nov. 18, 2016, all pages.
European Search Report for EP 16 16 0441 dated Jul. 7, 2016, all pages.
First Office Action for CN 201610142803.X dated Sep. 30, 2017, 10 pages.
U.S. Appl. No. 14/816,064, filed Aug. 3, 2015, Non-Final Rejection dated Apr. 29, 2016, all pages.
U.S. Appl. No. 14/816,064, filed Aug. 3, 2015, Notice of Allowance dated Aug. 31, 2016, all pages.
U.S. Appl. No. 14/816,065, filed Aug. 3, 2016, Non-Final Rejection dated May 3, 2016, all pages.
U.S. Appl. No. 14/816,065, filed Aug. 3, 2015, Notice of Allowance dated Aug. 26, 2016, all pages.
U.S. Appl. No. 14/821,789, filed Aug. 10, 2015, Non-Final Rejection dated Apr. 21, 2017, all pages.
U.S. Appl. No. 14/821,789, filed Aug. 10, 2015, Final Rejection dated Aug. 4, 2017, all pages.
U.S. Appl. No. 14/842,803, filed Sep. 1, 2015, Non-Final Rejection dated Apr. 29, 2016, all pages.
U.S. Appl. No. 14/842,803, filed Sep. 1, 2015, Notice of Allowance dated Sep. 12, 2016, all pages.
U.S. Appl. No. 14/967,370, filed Dec. 14, 2015, Non-Final Rejection dated Apr. 29, 2016, all pages.
U.S. Appl. No. 14/967,370, filed Dec. 14, 2015, Notice of Allowance dated Aug. 30, 2016, all pages.
U.S. Appl. No. 14/967,371, filed Dec. 14, 2015, Non-Final Rejection dated May 3, 2016, all pages.
U.S. Appl. No. 14/967,371, filed Dec. 14, 2015, Notice of Allowance dated Aug. 29, 2016, all pages.
U.S. Appl. No. 14/967,372, filed Dec. 14, 2015, Non-Final Rejection dated Apr. 10, 2017, all pages.
U.S. Appl. No. 14/967,372, filed Dec. 14, 2015, Non-Final Rejection dated Jul. 31, 2017, all pages.
U.S. Appl. No. 14/967,373, filed Dec. 14, 2015, Non-Final Rejection dated Apr. 29, 2016, all pages.
U.S. Appl. No. 14/967,373, filed Dec. 14, 2015, Final Rejection dated Sep. 2, 2016, all pages.
U.S. Appl. No. 14/967,373, filed Dec. 14, 2015, Notice of Allowance dated Nov. 16, 2016, all pages.
U.S. Appl. No. 14/967,356, filed Dec. 14, 2015, Final Rejection dated Jan. 19, 2017, all pages.
First Office Action and Search Report for CN 201610142817.1 dated Dec. 25, 2017, all pages.
Notice of Allowance dated Mar. 27, 2018 in the corresponding U.S. Appl. No. 14/967,372.

(56) References Cited

OTHER PUBLICATIONS

Non-Final Office Action dated May 14, 2018 in the corresponding U.S. Appl. No. 15/218,815.

* cited by examiner

BATTERY SYSTEM WITH HEAT EXCHANGE DEVICE

CROSS-REFERENCE TO RELATED APPLICATIONS

The present application is a division of Non-Provisional U.S. application Ser. No. 14/967,372, filed Dec. 14, 2015, which is a continuation of Non-Provisional U.S. application Ser. No. 14/281,789, filed Aug. 10, 2015, which claims priority to U.S. Provisional Patent Application No. 62/133,991, filed on Mar. 16, 2015, and U.S. Provisional Patent Application No. 62/150,848, filed on Apr. 22, 2015, the disclosures of which are hereby incorporated by reference in their entireties for all purposes.

BACKGROUND

Example embodiments of the present disclosure relate to a battery pack and a battery system, and more particularly, to a heat exchange device of the battery pack.

An electric vehicle uses a battery pack as an energy source. In order to ensure that the electric vehicle operates properly, the battery pack in the electric vehicle must be maintained within a certain range of temperature, i.e., the working temperature. Operating within the working temperature ensures that the battery pack performs efficiently and has a long service life. Due to the large influence of temperature on the performance and the service life of the battery pack, the working temperature of the battery pack and the consistency of the working states of the battery cells within the battery pack are very important in the design of the electric vehicle and the battery pack. As such, a need exists for a battery system with improved temperature regulation.

SUMMARY

Exemplary embodiments of the present disclosure may address at least some of the above-noted problems. For example, according to first aspects of the disclosure, systems for providing more effective heat exchange for a battery pack, e.g. a battery pack in an electric vehicle, are provided.

According to further aspects of the disclosure, a battery pack is provided including a plurality of battery cells, wherein the plurality of battery cells are arranged in multiple battery rows, and each battery cell row includes multiple battery cells. In some examples, one or more heat exchange spaces may be included, wherein each heat exchange space is arranged between adjacent battery cell rows or at one side of each battery cell row.

Embodiments may also include a device for providing heat exchange to the battery pack, wherein the device comprises a heat conduction medium passage arranged in the heat exchange spaces. In some examples, the heat conduction medium passage surrounds multiple battery cells in each battery cell row, and the heat conduction medium passage may be provided with at least a first group of channels and a second group of channels extending in a direction substantially perpendicular to the axial direction of each battery cell and arranged up and down along the axial direction of each battery cell.

In embodiments, the first group of channels and the second group of channels may be in contact with the surface of each battery cell, and the first group of channels and the second group of channels may be provided with at least one inlet and at least one outlet, respectively. A heat conduction medium may be provided in the first group of channels and the second group of channels, with the heat conduction medium in the first group of channels flowing from the inlets to the outlets of the channels thereof, and the heat conduction medium in the second group of channels flowing from the inlets to the outlets of the channels thereof. A heat insulation layer may also be arranged between the first group of channels and the second group of channels.

According to further aspects of the disclosure, a battery system is provided including a battery pack with a plurality of battery cells, wherein the plurality of battery cells are arranged in multiple battery cell rows, and each battery cell row comprises multiple battery cells. In embodiments, one or more heat exchange spaces may be provided, with each heat exchange arranged between adjacent battery cell rows or at one side of each battery cell row. may also include a device for providing heat exchange to the battery pack, the device including a heat conduction medium passage arranged in the heat exchanging spaces. In embodiments, the heat conduction medium passage may surround the multiple battery cells in each battery cell The heat conduction medium passage may be provided with at least a first group of channels and second group of channels extending in a direction substantially perpendicular to the axial of each battery cell and arranged up and down along the axial direction of each battery cell.

In embodiments, the first group of channels and the second group of channels may be in contact with the surface of each battery cell. The first group of channels and the second group of channels may be provided with at least one inlet and at least one outlet, respectively, and a heat conduction medium may be provided in the first group of channels and the second group of channels, with the heat conduction medium in the first group of channels flowing from the inlets to the outlets of the channels thereof, and the heat conduction medium in the second group of channels flowing from the inlets to the outlets of the channels thereof.

In embodiments, a heat insulation layer may be arranged between the first group of channels and the second group of channels. The heat insulation layer may include, for example, a thermal insulating material made of glass fiber, asbestos, rock wool, and/or aerogel felt. In some examples, the heat insulation layer may include an air-filled space between the first group of channels and the second group of channels.

In embodiments, the battery system may include one or more of a sensor for detecting the temperature of the battery pack, a controller for determining and sending a control signal according to the temperature value detected by the sensor, a heat conduction medium source for providing the heat conduction medium to the heat conduction medium passage, a pump for controlling the flow rate of the heat conduction medium according to the control signal sent by the controller, and/or a heat treatment device for heating or cooling the heat conduction medium entering into the heat conduction medium passage. Embodiments may include another passage, wherein the heat conduction medium source, the pump, the heat treatment device and the heat conduction medium passage are in fluid communication by means of the other passage.

According to yet further aspects of the present disclosure, an electric vehicle is provided, such that the electric vehicle includes a battery system as described herein.

Compared with the existing battery pack in the related art, advantages of various exemplary embodiments described herein may include effectively maintaining the temperature of the battery pack within a certain range of working temperature and guaranteeing the consistency of the temperatures of the battery cells. The above-noted advantages may be achieved, at least in part, by designing the heat exchange device in the battery pack to include at least two groups of heat conduction medium channels and a heat insulation layer between the two groups of channels. Further, the heat conduction medium may flow through the two groups of channels in opposite directions. Thus, various embodiments of the disclosure may improve the operating efficiency of the battery pack and effectively increase the service life of the battery pack.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of in the art to practice the embodiments of the invention. Accordingly, the examples and embodiments herein should not be construed as limiting the scope of the invention, which is defined solely by the appended claims and applicable law. Moreover, it is noted that like numerals reference similar parts throughout the several views of the drawings.

Figure 1A:
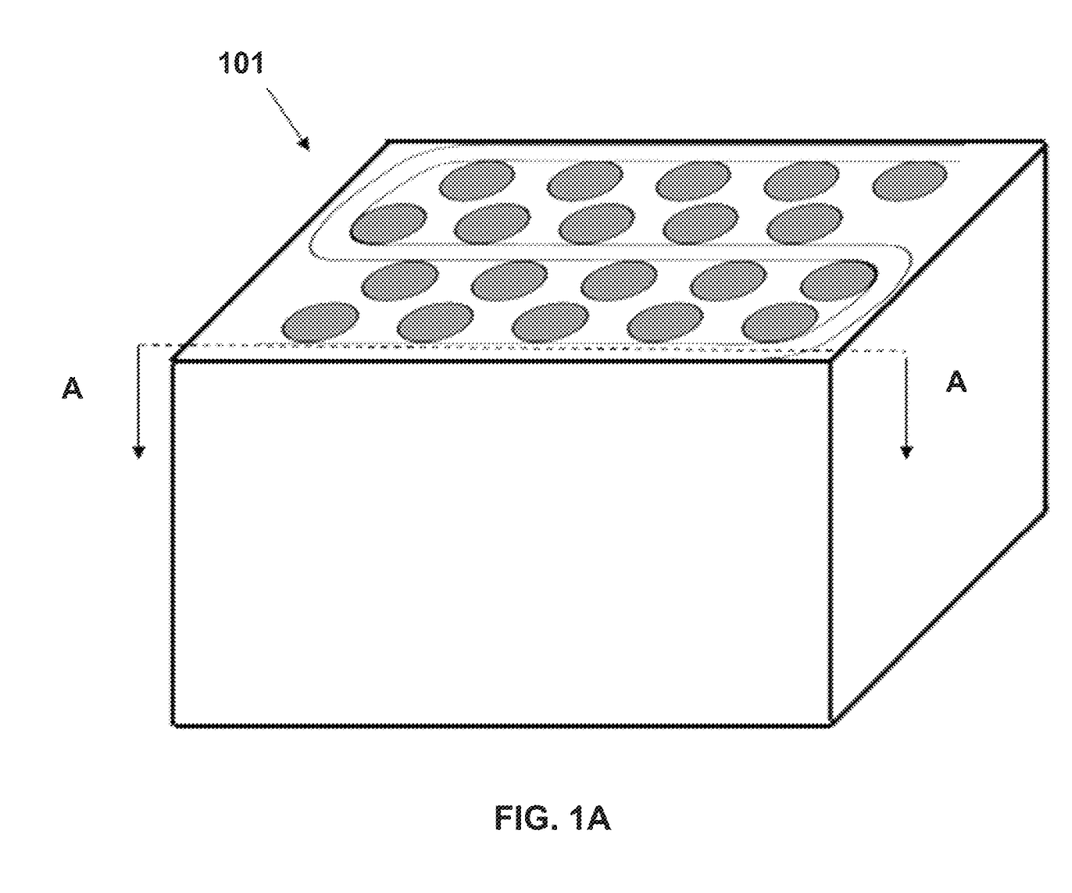
FIG. 1A is a perspective schematic view of a battery pack, according to an exemplary embodiment of the present disclosure.
Figure 1B:
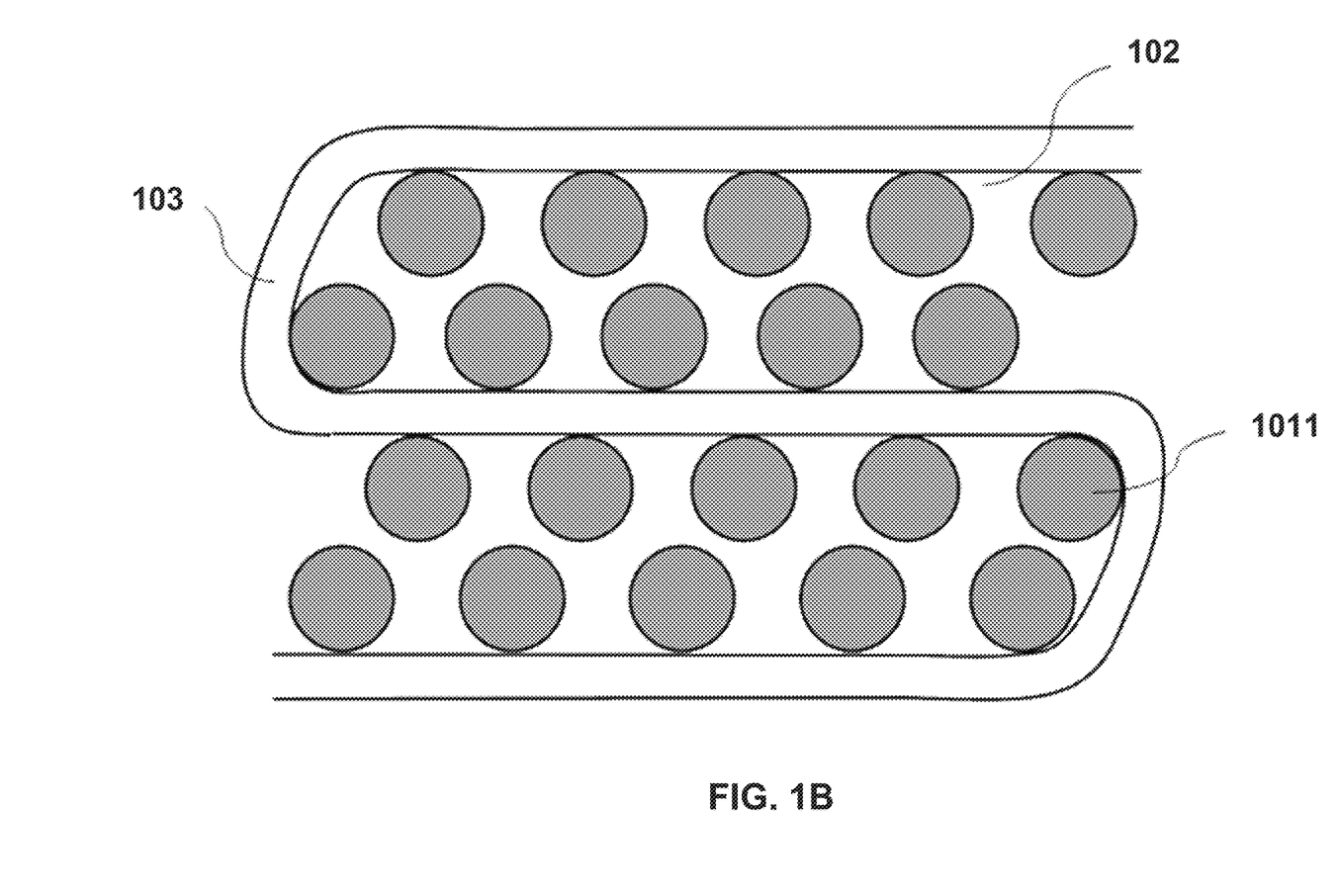
FIG. 1B is a top structural schematic view of the battery pack, according to an exemplary embodiment of the present disclosure.
Figure 2:
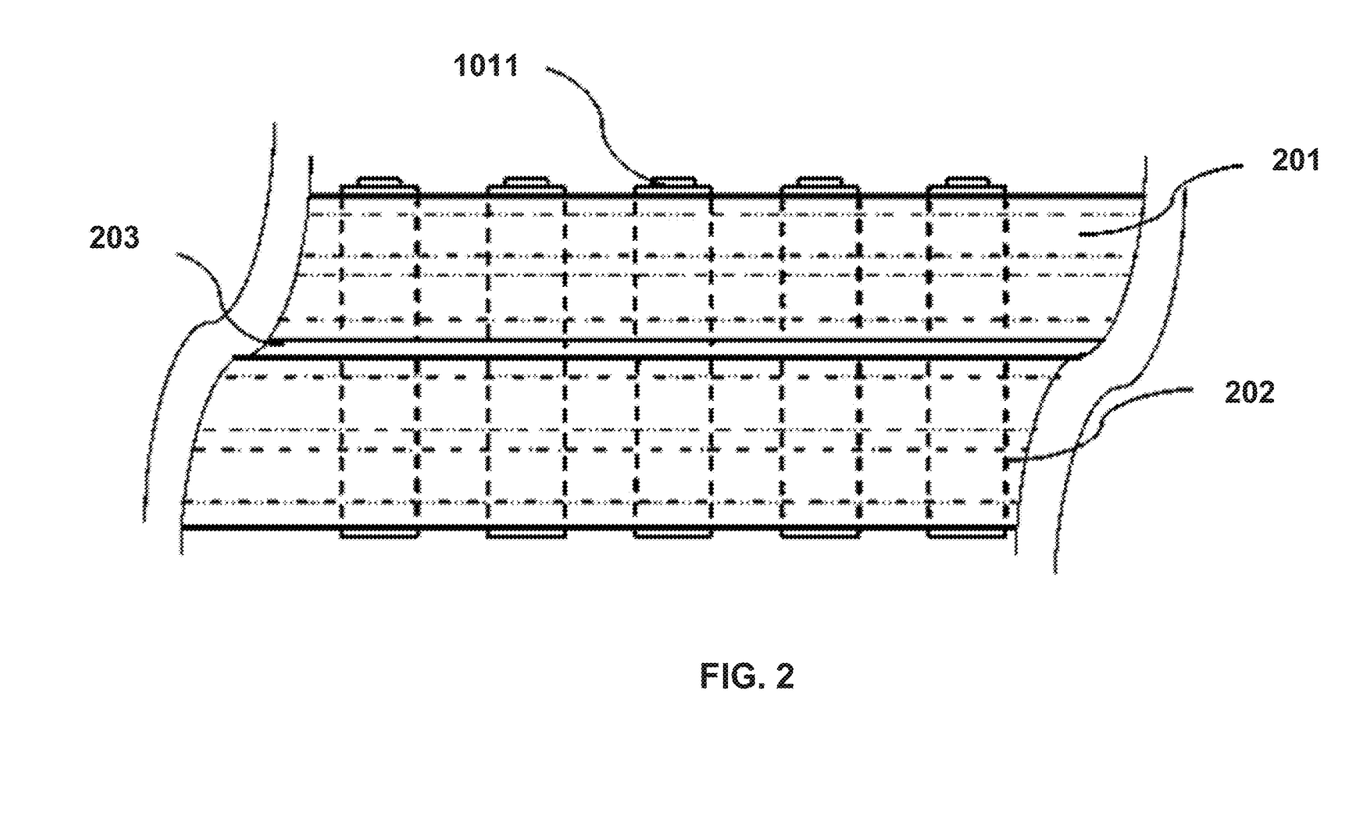
FIG. 2 is a sectional view along line A-A in FIG. 1A.

As shown in FIG. 1A, FIG. 1B, and FIG. 2, a battery pack 101 is provided with a plurality of battery cells 1011 arranged within a shell. The plurality of battery cells 1011 are arranged in one or more rows, i.e., battery cell rows, and each battery cell row includes one or more battery cells 1011. In an example embodiment, the battery cell rows include the same number of battery cells, and the battery cell rows are arranged to be approximately parallel with one another. Such an arrangement of the battery cells 1011 in the battery pack 101 facilitates the addition of a heat exchange device into the battery pack 101 and benefits the heat exchange consistency of the battery cells.

In an example embodiment, a heat exchange space 102 is arranged between two adjacent battery cell rows in order to reserve enough space between the two adjacent battery cell rows for placing the heat exchange device. In addition, the heat exchange space 102 may be provided at one side of a battery cell row, for example, at one side of the outermost battery cell row.

An example of providing the heat exchange spaces is illustrated below in detail with reference to FIG. 1B. FIG. 1B illustrates an example of a battery pack with four battery cell which are respectively a first battery cell row, a second battery cell row, a third battery cell row, and a fourth battery cell row from top to bottom in sequence. The heat exchange spaces 102 are respectively reserved on the outer side (namely, the side nearest to the shell) of the first battery row, between the second and the third battery cell rows, and on the outer side (namely, the side nearest to the shell) of the fourth battery cell row. While FIG. 1B shows an example of four battery cell rows, the present disclosure is not limited thereto. As such, more or less than four battery cell rows may be provided in the battery pack 101.

Figure 5:
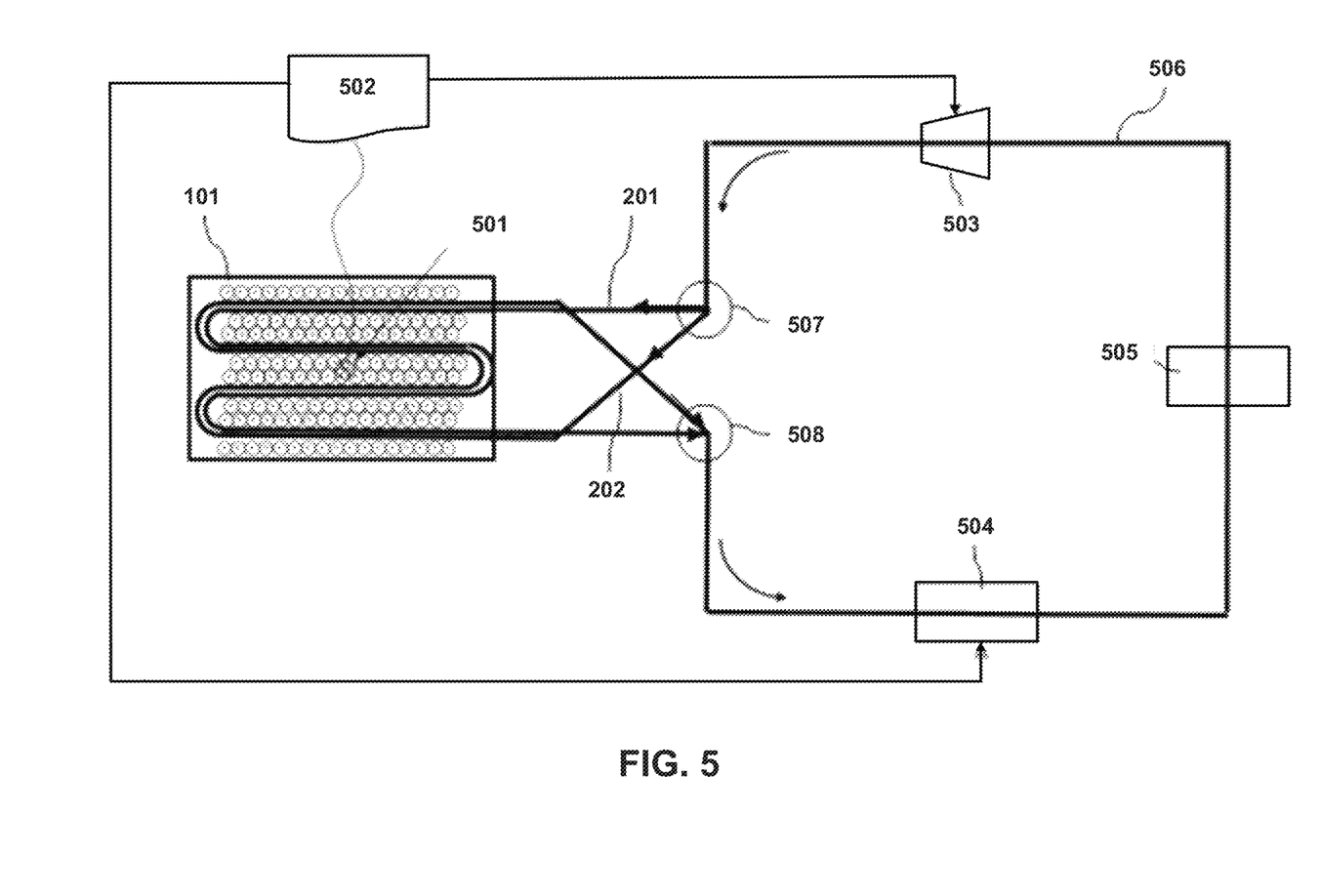
FIG. 5 is a structural block diagram of a battery system, according to an exemplary embodiment of the present disclosure.

In addition, in yet another example embodiment, all heat exchange spaces may be provided between the adjacent battery cell rows, as shown in FIG. 5. Notably, in FIG. 5, two battery cell rows are arranged between each pair of adjacent heat exchange spaces 102. This arrangement ensures that heat exchange may be carried out to each battery cell row while saving space so that the external volume of the battery pack is reduced. Of course, one or more than two battery cell rows may be arranged between each two adjacent heat exchange spaces 102. That is, the present disclosure is not limited to the arrangement of two battery cell rows between each pair of adjacent heat exchange spaces 102.

Referring to FIG. 1B, FIG. 2, FIG. 3, and FIG. 4, a heat conduction medium passage 103 may be arranged in the heat exchange spaces 102. Further, a heat conduction medium may flow in the heat conduction medium passage 103, thereby cooling or heating the battery via heat exchange between the heat conduction medium and the battery cell. For example, the heat conduction medium passage 103 may be made from materials with relatively high heat conductivity, such as a metal, and the heat conduction medium may be cooling water obtained by mixing water with ethylene glycol. However, the present disclosure is not limited to the above-noted examples. As such, the heat conduction medium passage 103 may be made from materials other than metal, and the heat conduction medium may be a mixture other than the mixture of water and ethylene glycol.

The heat conduction medium passage 103 extends in a serpentine manner through the battery pack 101, as shown in FIG. 1B. For example, the heat conduction medium passage 103 extends around the battery cell rows and surrounds multiple battery cells 1011 in the battery cell rows. Each battery cell 1011 is placed in a substantially vertical manner relative to the heat conduction medium passage 103. Referring to FIG. 2, as an example, the heat conduction passage 103 is formed with two groups of channels, namely, a first group of channels 201 and a second group of channels 202. The first group of channels 201 and the second group of channels 202 are arranged up and down along the axial direction of each battery cell 1011 and extend in a direction substantially perpendicular to the axial direction of each battery cell 1011. The first group of channels 201 and the second group of channels 202 are in contact with the surface of battery cell 1011 to carry out the exchanging of heat.

Since the first group of channels 201 and the second group of channels 202 are arranged along the axial direction of each battery cell 1011, as shown in FIG. 2, a particular battery cell 1011 makes contact with the first group of channels 201 and the second group of channels 202 at the same time. As such, the heat conduction medium in the two groups of channels may exchange heat with the same battery cell 1011. Additionally, arranging the two groups of channels in this manner is an efficient use of the space within the battery pack.

Figure 3:
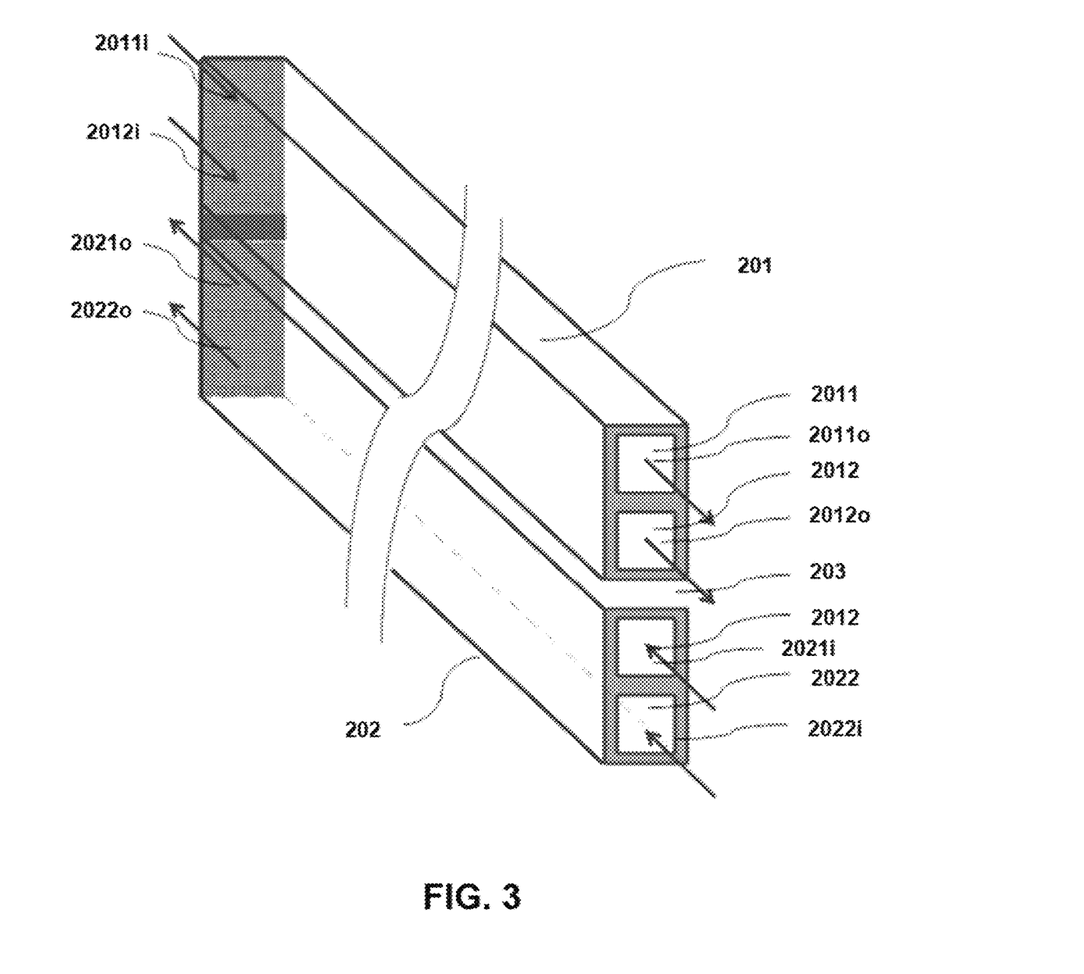
FIG. 3 is a perspective schematic view of a heat conduction medium passage, according to an exemplary embodiment of the present disclosure.

FIG. 3 illustrates a perspective view of the heat conduction medium passage 103. For convenience of illustration, only the parts close to an inlet and an outlet of the heat conduction medium passage 103 are illustrated in FIG. 3, while the middle portion that extends in a serpentine manner is omitted. As shown in FIG. 3, the first group of channels 201 and the second group of channels 202 respectively include two channels arranged up and down along the axial direction of battery cells. For example, the first group of channels 201, which is arranged near the top of battery cell 1011, may include two channels. Further, the second group of channels 202, which is arranged near the bottom of the battery cell 1011, may also include two channels. Of course, the example in FIG. 3 is not intended to limit the number of the channels in each group of channels. Each group of channels may also respectively include one channel or more than two channels. In this example embodiment, providing two channels in each group of channels increases the area of the passage wall made from a heat conduction material, while ensuring the utilization of the heat exchange spaces, so as to improve the heat conduction speed.

As shown in FIG. 2 and FIG. 3, a heat insulation layer 203 is provided between the first group of channels 201 and the second group of channels 202. By providing the heat insulation layer 203, the heat exchange between the heat conduction medium in the first group of channels 201 and the second group of channels 202 may be effectively insulated, so as to avoid decreasing the heat exchange efficiency between the heat conduction medium passage 103 and the battery cells 1011.

The heat insulation layer 203 may be a thermal insulating material with high heat insulation, such as glass fiber, asbestos, rock wool, aerogel felt, etc., however, the present disclosure is not limited thereto. Further, the material of the heat insulation layer may be directly adhered to the material of the two groups of channels.

Alternatively, in another example embodiment, the first group of channels 201 and the second group of channels 202 are spaced apart, and the air in the space between the first group of channels 201 and the second group of channels 202 serves as the heat insulation layer 203. In this example embodiment, the first group of channels 201 and the second group of channels 202 may be attached to a bracket in order to be spaced apart from each other, so that a space can be reserved for the air heat insulation layer 203.

Referring again to FIG. 3, the first group of channels 201 includes two channels 2011 and 2012, and each channel is respectively provided with an inlet 2011$i$/2012$i$ and an outlet 2011$o$/2012$o$. Similarly, the second group of channels 202 includes two channels 2021 and 2022, and each channel is respectively provided with an inlet 2021$i$/2022$i$ and an outlet 2021$o$/2022$o$. The heat conduction medium flows into the first group of channels 201 from the inlets 2011$i$, 2012$i$ of the two channels of the first group of channels 201 and flows out of the first group of channels 201 from the outlets 2011$o$, 2012$o$ of the two channels. Similarly, the heat conduction medium flows into the second group of channels 202 from the inlets 2021$i$, 2022$i$ of the two channels of the second group of channels 202 and flows out of the second group of channels 202 from the outlets 2021$o$, 2022$o$ of the two channels. The inlets and outlets of the respective channels of the first group of channels 201 and the second group of channels 202 are arranged in such a manner that the flow direction of the heat conduction medium in the first group of 201 is opposite to the flow direction of the heat conduction medium in the second group of channels 202. For example, the channel inlets of the first group of channels 201 and the channel outlets of the second group of channels 202 are located at one end of the heat conduction passage 103, and the channel outlets of the first group of channels 201 and the channel inlets of the second group of channels 202 are located at the other end of the heat conduction medium passage 103.

Since the flow directions of the heat conduction medium in the first group of channels 201 and the second group of channels 202 are opposite, the heat exchanging capacity of the heat conduction medium in the first group of channels 201 compensates for the heat exchanging capacity of the second group of channels 202 for a given battery cell 1011. As such, the respective heat exchange amounts of the first group of channels 201 and the second group of channels 202 in the heat conduction medium passage 103 are substantially the same for all battery cells in the battery pack.

As a description of the heat exchanging capacity of the first group of channels 201 and the second group of channels 202 for a given battery cell 1011, take for an example, a battery cell 1011 located near the channel inlets of the first group of channels 201 and near the channel outlets of the second group of channels 202. Here, the heat conduction medium in the first group of channels 201 enters the channels and then flows into the channels. Thus, the heat exchange capacity of the heat conduction medium in the first group of channels 201 at this point is relatively high. However, at this same location, the heat conduction medium in the second group of channels 202 has already exchanged heat with all battery cells it passed by while flowing to the channel outlets from the channel inlets. Thus, the heat exchange capacity of the heat conduction medium in the second group of channels 202 at this point is relatively low.

Additionally, for a battery cell 1011 located near the channel outlets of the first group of channels 201 and near the channel inlets of the second group of channels 202, the heat conduction medium in the second group of channels 202 enters the channels and then flows into the channels. Thus, the heat exchange capacity of the heat conduction medium in the second group of channels 202 at this point is relatively high. Further, at this location, the heat conduction medium in the first group of channels 201 has already exchanged heat with all battery cells it passed by while flowing to the channel outlets from the channel inlets. Thus, the heat exchange capacity of the heat conduction medium in the first group of channels 201 at this point is relatively low.

Accordingly, the heat exchange capacities of the heat conduction medium in the two groups of channels are mutually combined or compensated. In other words, the sum of the heat exchange capacity of the heat conduction medium in the two groups of channels for one particular battery cell is substantially the same as the sum of the heat exchange capacity of the heat conduction medium in the two groups of channels for any other battery cell. Thus, when the heating value of the battery pack is large, this balanced heat exchange capacity for each battery cell is particularly important.

In other example embodiments, the heat conduction medium passage 103 may also be provided with additional channel groups besides the first group of channels 201 and the second group of channels 202. Further, in other example embodiments, the balance of heat exchange for the battery pack is achieved using an even number of additional channel groups, however, the present disclosure is not limited thereto. In addition, the flow directions of the heat conduction medium in each pair of groups are opposite. For example, if the heat conduction medium passage 103 has four channel groups, the flow direction of the heat conduction medium in two groups of channels would be opposite to the flow direction of the heat conduction medium in the other two groups of channels.

As mentioned above, since the flow directions of the heat conduction medium in the first group of channels 201 and the second group of channels 202 are opposite, the temperature difference of the heat conduction medium in the two groups of channels at a particular position the heat conduction medium passage 103 may be large. Additionally, since the channels themselves have high heat conductivity, if the two groups of channels make contact with each other, heat exchange will occur between those two groups of channels. However, by providing heat insulation layer between the two groups of channels, heat exchange between the heat conduction medium in the first group of channels 201 and the second group of channels 202 may be effectively insulated, thereby ensuring consistent heat exchange of the heat conduction medium for the respective battery cells of the battery pack 101.

Figure 4:
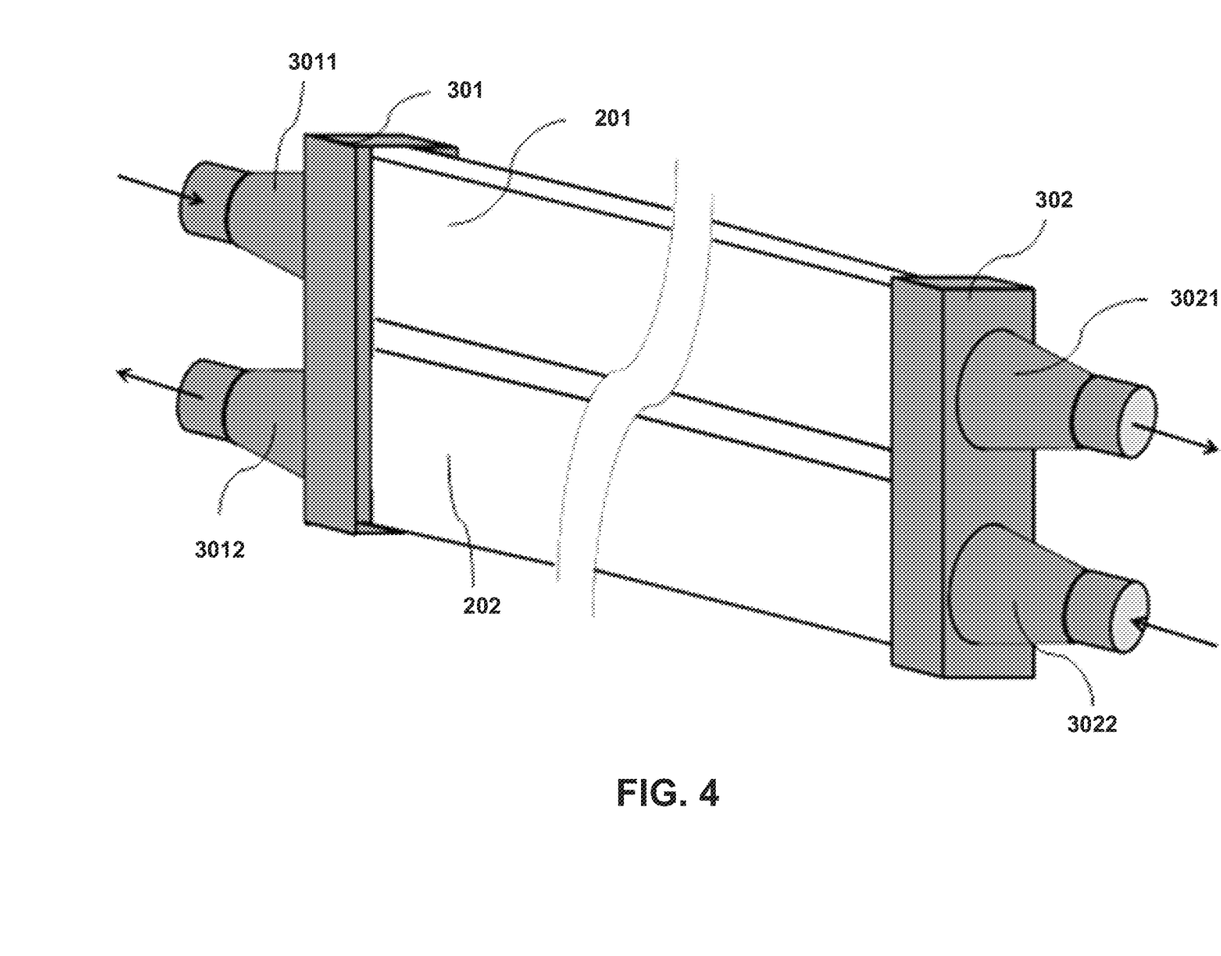
FIG. 4 is a schematic view of a port connecting structure of the heat conduction medium passage, according to an exemplary embodiment of the present disclosure.

In addition, the cross-section of each channel in any of the above-mentioned groups of channels may be of a square shape as shown in FIG. 4, however, the present disclosure is not limited thereto. As such, the cross-section of each channel may also be of other shapes, such as a circle.

Referring to FIG. 4, a port connecting structure of the heat conduction medium passage 103 is illustrated. As shown in FIG. 4, the heat conduction medium is introduced into and guided out of the ends of the heat conduction medium passage 103 via port connecting devices 301 and 302. Using port connecting device 301 as an example, one end of the port connecting device 301 communicates with the channel inlet/outlet of the heat conduction medium passage 103, and the other end communicates with an external equipment, for example, a heat conduction medium source. The same structure applies to port connecting device 302. Further, each of the port connecting devices 301 and 302 is provided with two ports, and each port is in fluid communication with a group of channels, including one or more channels. For example, the port connecting device 301 is provided with a first input port 3011 and a second output port 3012. first input port 3011 is in fluid communication with the two channel inlets 2011i, 2012i of the group of channels 201, and the second output port 3012 is in fluid communication with the two channel outlets 2021o, 2022o of the second group of channels 202. In addition, the port device 302 is provided with a second input port 3022 and a first output port 3021. The second port 3022 is in fluid communication with the two channel inlets 2021i, 2022i of the second group of channels 202, and the first output port 3021 is in fluid communication with the two channel outlets 2011o, 2012o of the first group of channels 201. By employing the port connecting 301 and 302, the heat conduction medium passage 103 may be easily connected with an external equipment, for example, a heat conduction medium source, regardless of the number of channels arranged in each group of channels.

Referring now to FIG. 5, a structural block diagram of a battery system, according to example embodiments of the present disclosure is illustrated. The battery system illustrated in FIG. 5 may include the battery pack as shown in FIG. 1-FIG. 4. To facilitate illustration of the flow directions of the heat conduction medium in the two groups of channels, in the example embodiment as shown in FIG. 5, the two groups of channels are arranged side by side. However, this is to merely indicate that two groups of channels are provided in the heat exchange spaces and not intended to limit the specific arrangement manner of the two groups of channels. The two groups of channels are respectively arranged at an upper portion and a lower portion of each battery cell 1011, along the axial direction of each battery cell as described above.

Referring to FIG. 5, the battery system includes the battery pack 101 as shown in FIG. 1-FIG. 4, and the heat conduction medium passage of the battery pack 101 includes the first group of channels 201 and the second group of channels 202. For the sake of brevity, the specific structure of the battery pack 101, which was described above, is omitted here.

Besides the battery pack 101, the battery system further includes a heat conduction medium source 505, a heat treatment device 504 and/or a heater, a pump 503, and a passage 506. The passage 506 is used for connecting the heat conduction medium passage 103 in the battery pack 101, the heat conduction medium source 505, the heat treatment device 504, and the pump 503 into a circuit.

The battery system is further provided with a sensor 501 and a controller 502. For example, the sensor 501 is arranged in the battery pack 101 for detecting the temperature of the battery pack 101 and sending a detection result to the controller 502. The controller 502 is in communication connection with the sensor 501 for determining and sending a control signal according to the temperature value detected by the sensor 501. The controller 502 is further in communication connection with the pump 503 and the heat treatment device 504 to send the control signal to the pump 503 and the heat treatment device 504.

The heat conduction medium source 505 is used for providing supplementary heat conduction medium to the battery system. The pump 503 may determine the flow rate of the heat conduction medium in the battery system according to the control signal sent by the controller 502. The heat treatment device 504 is used for heating or cooling the heat conduction medium flowing into or flowing out of the battery pack. The connecting sequence of the above components is not limited to the manner shown in FIG. 5, as long as the fluid communication of the heat conduction medium in the components can be achieved.

The working manner of the above-described battery system is discussed below by taking an example in which the battery pack is cooled.

For example, when cooling the battery pack, the sensor 501 detects the temperature of the battery pack 101 and sends the temperature information to the controller 502. The controller 502 judges whether the temperature is within the normal working temperature range of the battery pack. If the temperature exceeds the normal working temperature range, the controller sends the control signal to the pump 503 and/or the heat treatment device 504. After receiving the control signal, the pump 503 accelerates the flow rate of the heat conduction medium in the heat exchange system of the battery pack. The heat conduction medium flows into the battery pack 101 from the heat conduction medium source 505 and flows out of the battery pack 101 after cooling the battery pack. Before the heat conduction medium flows back into the heat conduction medium source 505, the heat treatment device 504 carries out heat treatment on the heat conduction medium which absorbed the heat of the battery pack 101 to restore its initial temperature. After the initial temperature of the heat conduction medium is restored, the heat conduction medium flows back into the heat conduction medium source 505.

As shown in FIG. 5, the heat conduction medium flows into the battery pack 101 from an inlet connector 507. The inlet connector 507 splits the heat conduction medium to enable the heat conduction medium to respectively flow into the first group of channels 201 and the second group of channels 202. Further, the heat conduction medium in the first group of channels 201 and the second group of channels 202 is gathered by an outlet connector 508 and flows back into the heat conduction medium source 505 after being treated by the heat treatment device 504.

In other example embodiments, the heat treatment device 504 may not be connected with the controller.

The present disclosure further provides an electric vehicle using the above-mentioned battery system.

Although the present disclosure has been described with reference to the specific embodiments shown in the drawings, it should be understood that the lightweight fastening methods provided by the present disclosure can have a variety of variations without departing the spirit, scope and background of the present disclosure. The description given above is merely illustrative and is not meant to be an exhaustive list of all possible embodiments, applications or modifications of the invention. Those of ordinary skill in the art should be still aware that, parameters in the embodiments disclosed by the present disclosure can be changed in different manners, and these changes shall fall within the spirit and scope of the present disclosure and the claims. Thus, various modifications and variations of the described methods and systems of the invention will be apparent to those skilled in the art without departing from the scope and spirit the invention.

What is claimed is:

1. A battery system, comprising:
a battery pack, wherein the battery pack includes:
a plurality of battery cells, wherein the plurality of battery cells are arranged in multiple battery cell rows, and each battery cell row comprises multiple battery cells,
a device for providing heat exchange to the battery pack, wherein the device includes a heat conduction medium passage, the heat conduction medium passage comprising at least a first group of channels and a second group of channels, wherein
the first group of channels and the second group of channels are in contact with a surface of each battery cell,
the first group of channels and the second group of channels are each provided with at least one inlet and at least one outlet, such that a heat conduction medium in the first group of channels flows directly into the first group of channels at the same time or substantially at the same as the heat conduction medium in the second group of channels flows directly into the second group of channels in an opposite direction, and wherein the second group of channels and first group of channels are distinct and separate from each other such that the second group of channels and first group of channels are not connected through a turnaround section within a housing containing the plurality of battery cells, and
a heat insulation layer is arranged between the first group of channels and the second group of channels such that the first group of channels and the second group of channels are not in fluid communication with each other;
a sensor to detect a temperature of the battery pack;
a controller configured to determine and send a control signal according to a temperature value detected by the sensor; and
a pump configured to control the flow rate of the heat conduction medium according to the control signal sent by the controller.

2. The battery system of claim 1, wherein the heat insulation layer comprises a thermal insulating material made from at least one of glass fiber, asbestos, rock wool, and aerogel felt.

3. The battery system of claim 1, wherein the first group of channels and the second group of channels are spaced apart, and air in the space between the first group of channels and the second group of channels forms the heat insulation layer.

4. The battery system of claim 1, wherein a flow direction of the heat conduction medium in the first group of channels is opposite to a flow direction of the heat conduction medium in the second group of channels.

5. An electric vehicle, comprising:
an electric motor;

a battery pack configured to power the electric motor, the battery pack including:
a plurality of battery cells, wherein the plurality of battery cells are arranged in multiple battery cell rows, and each battery cell row comprises multiple battery cells,
a device for providing heat exchange to the battery pack, wherein the device includes a heat conduction medium passage, the heat conduction medium passage comprising at least a first group of channels and a second group of channels, wherein
the first group of channels and the second group of channels are in contact with a surface of each battery cell,
the first group of channels and the second group of channels are each provided with at least one inlet and at least one outlet, such that a heat conduction medium in the first group of channels flows directly into the first group of channels at the same time or substantially at the same as the heat conduction medium in the second group of channels flows directly into the second group of channels in an opposite direction, and wherein the second group of channels and first group of channels are distinct and separate from each other such that the second group of channels and first group of channels are not connected through a turnaround section within a housing containing the plurality of battery cells, and
a heat insulation layer is arranged between the first group of channels and the second group of channels such that the first group of channels and the second group of channels are not in fluid communication with each other;
a sensor to detect a temperature of the battery pack;
a controller configured to determine and send a control signal according to a temperature value detected by the sensor; and
a pump configured to control the flow rate of the heat conduction medium according to the control signal sent by the controller.

6. The vehicle of claim 5, wherein the heat insulation layer comprises a thermal insulating material made from at least one of glass fiber, asbestos, rock wool, and aerogel felt.

7. The vehicle of claim 5, wherein the first group of channels and the second group of channels are spaced apart, and air in the space between the first group of channels and the second group of channels forms the heat insulation layer.

8. The vehicle of claim 5, wherein a flow direction of the heat conduction medium in the first group of channels is opposite to a flow direction of the heat conduction medium in the second group of channels.

\* \* \* \* \*